US012212920B2

(12) United States Patent
Zheng et al.

(10) Patent No.: US 12,212,920 B2
(45) Date of Patent: Jan. 28, 2025

(54) LOUDSPEAKER MODULE AND ELECTRONIC APPARATUS

(71) Applicant: GOERTEK INC., Shandong (CN)

(72) Inventors: Zedong Zheng, Shandong (CN); Guodong Zhao, Shandong (CN); Feng Zhang, Shandong (CN); Peng Zhang, Shandong (CN)

(73) Assignee: GOERTEK INC., Weifang (CN)

( * ) Notice: Subject to any disclaimer, the term of this patent is extended or adjusted under 35 U.S.C. 154(b) by 328 days.

(21) Appl. No.: 17/778,466

(22) PCT Filed: Nov. 16, 2020

(86) PCT No.: PCT/CN2020/128904
§ 371 (c)(1),
(2) Date: May 20, 2022

(87) PCT Pub. No.: WO2021/098624
PCT Pub. Date: May 27, 2021

(65) Prior Publication Data

US 2022/0417649 A1 Dec. 29, 2022

(30) Foreign Application Priority Data

Nov. 22, 2019 (CN) ......................... 201911164090.7

(51) Int. Cl.
*H04R 1/28* (2006.01)
*H04R 1/02* (2006.01)

(52) U.S. Cl.
CPC ........... *H04R 1/2811* (2013.01); *H04R 1/025* (2013.01); *H04R 2499/11* (2013.01)

(58) Field of Classification Search
CPC . H04R 1/02; H04R 1/025; H04R 1/28; H04R 1/2803; H04R 1/2807;
(Continued)

(56) References Cited

U.S. PATENT DOCUMENTS 10,349,165 B2 7/2019 Cao
10,757,493 B2 * 8/2020 Fan ........................ H04R 1/023
(Continued)

FOREIGN PATENT DOCUMENTS

CN 105142046 A * 12/2015 ............. H04R 1/023
CN 107592598 A 1/2018
(Continued)

OTHER PUBLICATIONS

International Search Report from International Application No. PCT/CN2020/128904 mailed Feb. 19, 2021.

*Primary Examiner* — Edgardo San Martin
(74) *Attorney, Agent, or Firm* — Shih IP Law Group, PLLC

(57) ABSTRACT

A loudspeaker module and an electronic apparatus are disclosed, the loudspeaker module comprises a housing, a loudspeaker unit and a barrier rib body; the loudspeaker unit is provided in an inner cavity of the housing and divides the inner cavity of the housing into a front acoustic cavity and a rear acoustic cavity, the rear acoustic cavity is filled with sound-absorbing particles, and a cavity wall of the rear acoustic cavity is provided with a leakage hole. The barrier rib body is provided in the rear acoustic cavity, at least a part of the barrier rib body faces the leakage hole, and the distance between the leakage hole and the part of the barrier rib body facing the leakage hole is less than the size of the sound-absorbing particles. The technical solution can reduce the occurrence of the situation where the sound-absorbing particles block the leakage hole.

10 Claims, 7 Drawing Sheets

(58) Field of Classification Search
CPC .... H04R 1/2811; H04R 1/2876; H04R 1/288; H04R 9/02; H04R 9/06; H04R 2499/11
See application file for complete search history.

(56) References Cited

U.S. PATENT DOCUMENTS

| | | | | |
|---|---|---|---|---|
| 10,889,525 | B2 * | 1/2021 | Cao | G10K 11/162 |
| 11,206,491 | B2 * | 12/2021 | Zhou | H04R 9/02 |
| 2017/0353785 | A1 * | 12/2017 | Choi | H04R 1/025 |
| 2018/0115819 | A1 | 4/2018 | Yang et al. | |
| 2018/0270338 | A1 * | 9/2018 | Yan | H04R 9/06 |
| 2023/0239613 | A1 * | 7/2023 | Hu | H04R 1/288<br>181/151 |

FOREIGN PATENT DOCUMENTS

| | | | | | |
|---|---|---|---|---|---|
| CN | 107623886 | A | * | 1/2018 | |
| CN | 107809707 | A | | 3/2018 | |
| CN | 107948891 | A | | 4/2018 | |
| CN | 207399498 | U | * | 5/2018 | |
| CN | 207720403 | U | | 8/2018 | |
| CN | 110958507 | A | | 4/2020 | |
| EP | 3285499 | A1 | | 2/2018 | |
| WO | WO-2019179201 | A1 | * | 9/2019 | H04R 1/2876 |
| WO | WO-2021164015 | A1 | * | 8/2021 | G06F 1/1633 |

* cited by examiner

LOUDSPEAKER MODULE AND ELECTRONIC APPARATUS

TECHNICAL FIELD

The present disclosure relates to the technical field of sound energy conversion, in particular, relates to a loudspeaker module and an electronic apparatus.

BACKGROUND ART

Generally, a loudspeaker module includes a housing, the housing accommodates a loudspeaker unit therein, and the loudspeaker unit divides an inner cavity of the entire module into two cavities, a front acoustic cavity and a rear acoustic cavity. In order to reduce the low frequency of the module and expand the bandwidth, the rear acoustic cavity may be filled with sound-absorbing particles, and in order to balance the air pressure inside and outside the loudspeaker module, the housing may be provided with a leakage hole that communicates with the rear acoustic cavity. However, when the gas in the rear acoustic cavity is discharged through the leakage hole, the sound-absorbing particles may be driven to flow towards the leakage hole, which causes the sound-absorbing particles to be easily stuck and block the leakage hole and affect the sound output effect.

SUMMARY

The main object of the present disclosure is to provide a loudspeaker module, which is intended to reduce the occurrence of the situation that the sound-absorbing particles block the leakage hole.

In order to achieve the above object, the present disclosure provides a loudspeaker module including:

a housing;

a loudspeaker unit disposed in an inner cavity of the housing and divides the inner cavity of the housing into a front acoustic cavity and a rear acoustic cavity, the rear acoustic cavity is filled with sound-absorbing particles, and a cavity wall of the rear acoustic cavity is provided with a leakage hole; and a barrier rib body disposed in the rear acoustic cavity, at least a part of the barrier rib body faces the leakage hole, and a distance between the leakage hole and the part of the barrier rib body facing the leakage hole is less than a size of the sound-absorbing particles.

Optionally, the rear acoustic cavity includes a bottom cavity wall and a side cavity wall connected to the bottom cavity wall, the leakage hole is provided on the side cavity wall, and the barrier rib body is configured to protrude on the bottom cavity wall.

Optionally, a height of the barrier rib body is larger than a distance between a hole edge of the leakage hole away from the bottom cavity wall and the bottom cavity wall.

Optionally, the barrier rib body has a limiting surface, the limiting surface faces the cavity wall of the rear acoustic cavity provided with the leakage hole, and the limiting surface has a plane section, and a distance between the plane section and the cavity wall of the rear acoustic cavity is smaller than the size of the sound-absorbing particles.

Optionally, the limiting surface further has an inclined section connected with the plane section, the inclined section is located at a side of the plane section away from the leakage hole, and a distance between the inclined section and the cavity wall of the rear acoustic cavity gradually increases in a direction away from the leakage hole.

Optionally, the present disclosure is provided with two barrier rib bodies, the two barrier rib bodies are arranged to be spaced from each other, and the leakage hole is located between the two barrier rib bodies.

Optionally, a distance between ends of the two barrier rib bodies adjacent to the leakage hole is smaller than the size of the sound-absorbing particles.

Optionally, a distance between the two barrier rib bodies is configured to gradually increase in a direction away from the leakage hole.

Optionally, the barrier rib body is integrally formed with the housing.

The present disclosure further provides an electronic apparatus including a loudspeaker module, the loudspeaker module includes a housing, a loudspeaker unit and a barrier rib body, the loudspeaker unit is disposed in an inner cavity of the housing and divides the inner cavity of the housing into a front acoustic cavity and a rear acoustic cavity, the rear acoustic cavity is filled with sound-absorbing particles therein, and a cavity wall of the rear acoustic cavity is provided with a leakage hole. The barrier rib body is provided in the rear acoustic cavity, at least a part of the barrier rib body faces the leakage hole, and a distance between the leakage hole and the part of the barrier rib body facing the leakage hole is less than a size of the sound-absorbing particles.

According to the present disclosure, a barrier rib body is provided in the rear acoustic cavity, and at least a part of the barrier rib body faces the leakage hole, so as to prevent the sound-absorbing particles from flowing to the leakage hole in a direction directly opposite to the leakage hole, and when a distance between the leakage hole and the part of the barrier rib body facing the leakage hole is less than a size of the sound-absorbing particles, the sound-absorbing particles can be blocked from flowing to the leakage hole from between the barrier rib body and the cavity wall of the rear acoustic cavity. That is, by providing the barrier rib body, the sound-absorbing particles can be blocked from flowing to the leakage hole, and furthermore the sound-absorbing particles can be spaced from the leakage hole, which effectively reduces the occurrence of the situation that the sound-absorbing particles block the leakage hole. In addition, it will be understood that when the sound-absorbing particles block the leakage hole, the exhaust cross section of the leakage hole is greatly reduced, resulting in an instantaneous increase of the flow rate of gas flowing towards a gap between the sound-absorbing particles and the leakage hole in proximity of the leakage hole, which will further drive a large number of sound-absorbing particles in proximity of the leakage hole to move violently, and the sound-absorbing particles collide with each other and produce large noise. When the sound-absorbing particles are blocked by the barrier rib body so that the sound-absorbing particles are spaced from the leakage hole, the gap between the sound-absorbing particles and the leakage hole can be ensured to be large, so as to effectively reduce the occurrence of the above-mentioned defects.

BRIEF DESCRIPTION OF THE DRAWINGS

In order to explain embodiments of the present disclosure or technical solutions in the prior art more clearly, the following briefly introduces the accompanying drawings that are used in the description of the embodiments or the prior art. Obviously, the drawings in the following description only illustrate some embodiments of the present disclosure, and other drawings can also be obtained according to the structures shown in these drawings without creative efforts by those skilled in the art.

REFERENCE NUMERALS

Figure 1:
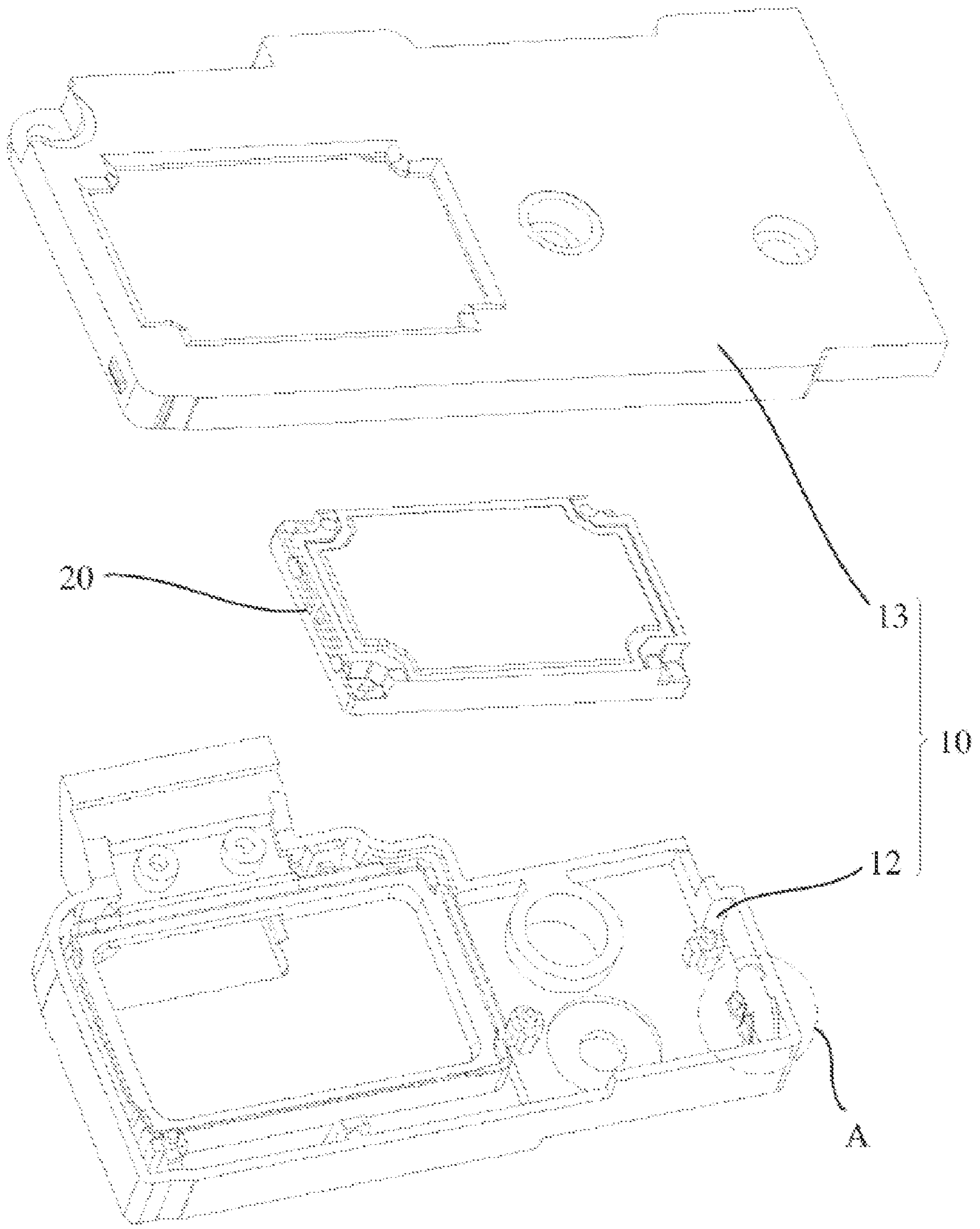
FIG. 1 is an exploded schematic view illustrating a housing and a loudspeaker unit in an embodiment of a loudspeaker module according to the present disclosure.
Figure 2:
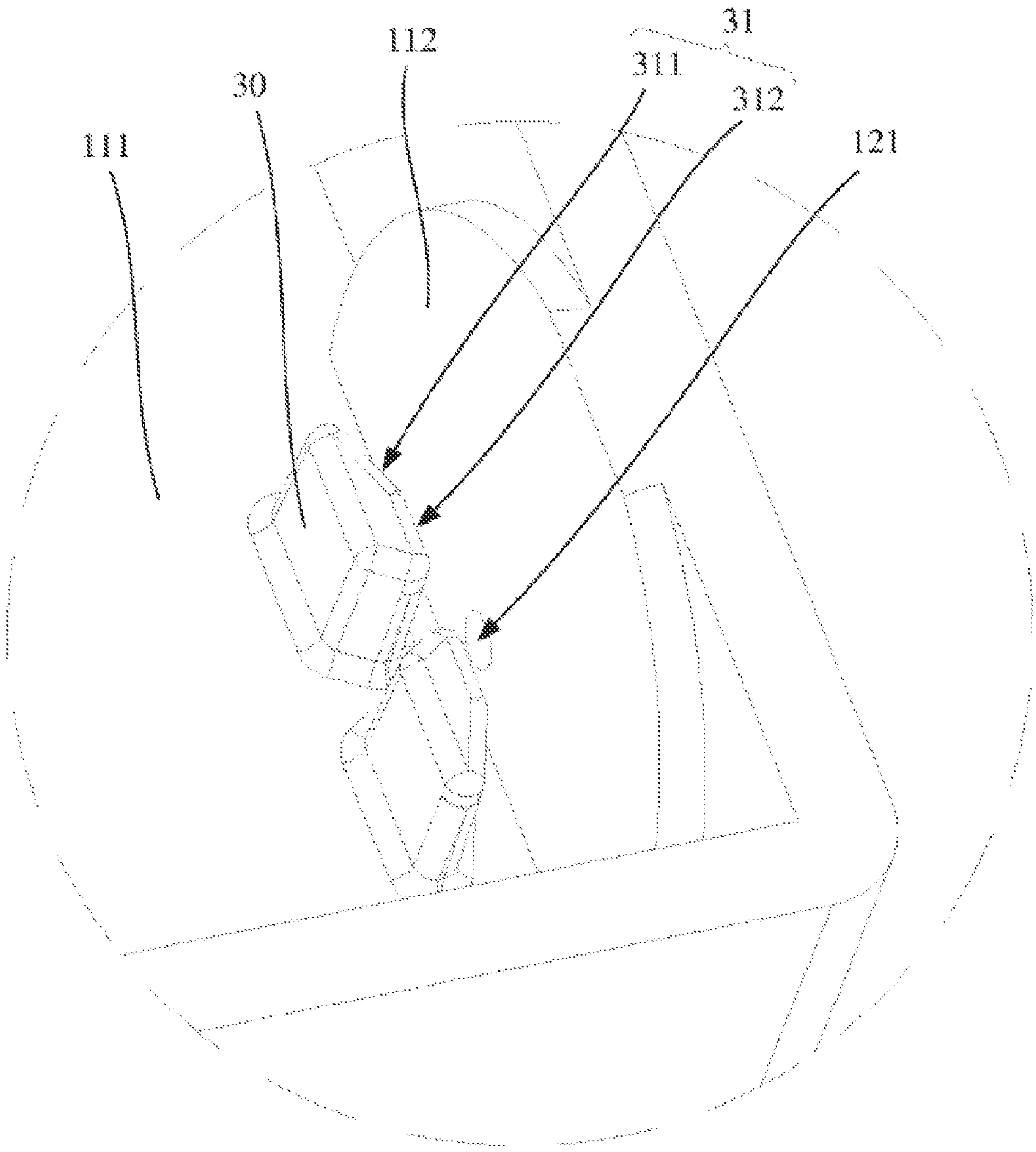
FIG. 2 is an enlarged view of A region in FIG. 1.

| Reference numerals | Name |
|---|---|
| 10 | housing |
| 11 | rear acoustic cavity |
| 111 | bottom cavity wall |
| 112 | side cavity wall |
| 12 | upper housing |
| 121 | leakage hole |
| 122 | filling hole |
| 13 | lower housing |
| 20 | loudspeaker unit |
| 30 | barrier rib body |
| 31 | limiting surface |
| 311 | plane section |
| 312 | inclined section |
| 40 | sound-absorbing particles |

The realization of the object, functional features and advantages of the present disclosure will be further described in conjunction with the embodiments with reference to the accompanying drawings.

DETAILED DESCRIPTION OF THE EMBODIMENTS

The technical solutions in the embodiments of the present disclosure will be clearly and completely described below with reference to the accompanying drawings. Obviously, the described embodiments are only a part of the embodiments of the present disclosure, but not all embodiments of the present disclosure. All other embodiments obtained by those of ordinary skill in the art based on the embodiments of the present disclosure without creative work fall within the protection scope of the present disclosure.

It should be noted that if there are directional indications (such as up, down, left, right, front, rear, etc.) involved in the embodiments of the present disclosure, the directional indications are only used to explain the relative position relationship and motion between components in a specific attitude (as shown in the accompanying drawings), and if the specific attitude changes, the directional indication also changes accordingly.

In addition, if there are descriptions involving “first”, “second”, etc. in the embodiments of the present disclosure, these descriptions are only used for descriptive purposes, and should not be construed as indicating or implying its relative importance or implicitly indicating the number of indicated technical features. Thus, a feature defined with “first” and “second” may explicitly or implicitly include at least one of such feature. In addition, the meaning of “and/or” in the full text is to include three parallel schemes. Taking “A and/or B” as an example, it includes a scheme A, a scheme B, or a scheme A and B. In addition, the technical solutions between various embodiments can be combined with each other, but must be based on the realization by those of ordinary skill in the art. When the combination of technical solutions is contradictory or impossible to be realized, it should be considered that the combination of such technical solutions does not exist and is not within the protection scope of the present disclosure.

The present disclosure provides a loudspeaker module, which can be used for electronic apparatus such as earphones and mobile phones that can produce sound.

In an embodiment of the present disclosure, referring to FIGS. 1 to 4, the loudspeaker module includes a housing 10, a loudspeaker unit 20 and a barrier rib body 30; the loudspeaker unit 20 is disposed in an inner cavity of the housing 10 and divides the inner cavity of the housing 10 into a front acoustic cavity (not shown in the figures) and a rear acoustic cavity 11, the rear acoustic cavity 11 is filled with sound-absorbing particles 40, and a cavity wall of the rear acoustic cavity 11 is provided with a leakage hole 21. The barrier rib body 30 is disposed in the rear acoustic cavity 11, at least a part of the barrier rib body 30 faces the leakage hole 121, and the distance between the leakage hole 121 and the part of the barrier rib body 30 facing the leakage hole 121 is less than the size of the sound-absorbing particles 40.

In this embodiment, the housing 10 includes an upper housing 12 and a lower housing 13, wherein the upper housing 12 and the lower housing 13 enclose to form the inner cavity of the housing 10, and the loudspeaker unit 20 and the lower housing 13 enclose to form the front acoustic cavity, and the loudspeaker unit 20, the lower housing 13 and the upper housing 12 enclose together to form the rear acoustic cavity 11. The leakage hole 121 is provided on the housing 10 and penetrates the cavity wall of the rear acoustic cavity 11. The barrier rib body 30 and the leakage hole 121 may be arranged on the upper housing 12 or the lower housing 13 together, or the barrier rib body 30 and the leakage hole 121 may be respectively arranged on the upper housing 12 and the lower housing 13, and the barrier rib body 30 can be matched with the leakage hole 121 after assembling the upper housing 12 and the lower housing 13. Of course, in other embodiments, the housing 10 may also be provided in an integral housing form.

The part of the barrier rib body 30 facing the leakage hole 121 is spaced apart from the cavity wall at which the leakage hole 121 is located, and an orthographic projection of projecting the part of the barrier rib body 30 facing the leakage hole 121 on the cavity wall at which the leakage hole 121 is located, is in the leakage hole 121, and a distance between the part of the barrier rib body 30 facing the leakage hole 121 and the cavity wall where the leakage hole 121 is located is smaller than the size of the sound-absorbing particles 40. The sound-absorbing particles 40 may have various shapes, for example, the shape of the sound-absorbing particles 40 may be spherical or spheroidal, and the size of the sound-absorbing particles 40 is the diameter of the spherical particles or the diameter of the spheroidal particles. When the sound-absorbing particles 40 have block-like shape, the size of the sound-absorbing particles 40 is the outer size of the block-shaped particles, or the like. In addition, the diameter of the leakage hole 121 may be smaller than the size of the sound-absorbing particles 40, or the diameter of the leakage hole 121 may be greater than or equal to the size of the sound-absorbing particles 40. When the distance between the part of the barrier rib body 30 facing the leakage hole 121 and the leakage hole 121 is smaller than the size of the sound-absorbing particles 40, the sound-absorbing particles 40 can be blocked from moving between the barrier rib body 30 and the cavity wall of the rear acoustic cavity 11 towards the leakage hole 121.

In this embodiment, the loudspeaker unit 20 includes a vibration system (not shown in the figures) and a magnetic circuit system (not shown in the figures), and the vibration system includes a diaphragm and a voice coil fixed on one side of the diaphragm, and the diaphragm includes a central portion, a ring portion arranged around the central portion, and a fixing portion arranged around the ring portion, the diaphragm may further include a composite layer combined at the central portion. The magnetic circuit system includes a magnetic conductive yoke, an inner magnetic circuit portion and an outer magnetic circuit portion are arranged on the magnetic conductive yoke, and a magnetic gap for accommodating the voice coil is formed between the inner magnetic circuit portion and the outer magnetic circuit portion. In one case, the inner magnetic circuit portion includes a central magnet arranged at the center of the magnetic conductive yoke and a central magnetic conductive plate arranged on the central magnet, and the outer magnetic circuit portion includes a side magnet arranged at the edge of the magnetic conductive yoke and a side magnetic conductive plate arranged on the side magnet. The loudspeaker unit 20 may further include an auxiliary system, the auxiliary system includes a housing for accommodating and fixing the vibration system and the magnetic circuit system. In addition, the auxiliary system may further include a front cover, the front cover is combined on the housing, and the front cover and the housing enclose to form a protective frame of the loudspeaker unit 20. Of course, in some cases, the loudspeaker unit 20 may also not include an auxiliary system.

According to the present disclosure, the barrier rib body 30 is provided in the rear acoustic cavity 11, and at least a part of the barrier rib body 30 faces the leakage hole 121, so as to block the sound-absorbing particles 40 from flowing to the leakage hole 121 in a direction directly opposite to the leakage hole 121, and when the distance between the leakage hole 121 and the part of the barrier rib body 30 facing the leakage hole 121 is less than the size of the sound-absorbing particles 40, the sound-absorbing particles 40 can be blocked from flowing to the leakage hole 121 from between the barrier rib body 30 and the cavity wall of the rear acoustic cavity 11. That is, by providing the barrier rib body 30, the sound-absorbing particles 40 can be blocked from flowing to the leakage hole 121, and furthermore the sound-absorbing particles 40 can be spaced from the leakage hole 121, so as to effectively reduce the occurrence of the situation where the sound-absorbing particles 40 block the leakage hole 121. In addition, it will be understood that when the sound-absorbing particles 40 block the leakage hole 121, the gas-exhaust cross section of the leakage hole 121 is greatly reduced, resulting in an instantaneous increase of the flow rate of gas flowing to a gap between the sound-absorbing particles 40 and the leakage hole 121 in proximity of the leakage hole 121, which will further drive a large number of sound-absorbing particles 40 in proximity of the leakage hole 121 to move violently, and the sound-absorbing particles 40 collide with each other and produce large noise. When the sound-absorbing particles 40 are blocked by the barrier rib body 30 so that the sound-absorbing particles 40 are spaced from the leakage hole 121, the gap between the sound-absorbing particles 40 and the leakage hole 121 can be ensured to be large, so as to effectively reduce the occurrence of the above-mentioned defects.

In an embodiment, the rear acoustic cavity 11 includes a bottom cavity wall 111 and a side cavity wall 112 connected to the bottom cavity wall 111, the leakage hole 121 is provided on the side cavity wall 112, and the barrier rib body 30 is provided to be protruded on the bottom cavity wall 111. Specifically, the bottom cavity wall 111 and the side cavity wall 112 are formed on the upper housing 12, the bottom cavity wall 111 is disposed opposite to the lower housing 13, and the side cavity wall 112 extends along a periphery of the bottom cavity wall 111 to form into an annular shape, the leakage hole 121 is spaced apart from the bottom cavity wall 111, the barrier rib body 30 is spaced apart from the side cavity wall 112, the projection of projecting the barrier rib body 30 on the side cavity wall 112 is at least partially located in the leakage hole 121, and the distance between the barrier rib body 30 and the side cavity wall 112 is smaller than the size of the sound-absorbing particles 40 so as to enable the sound-absorbing particles 40 to be spaced from the leakage hole 121. Since the barrier rib body 30 as a whole is spaced apart from the side cavity wall 112, the situation that the barrier rib body 30 extends into the leakage hole 121 to cause the gas-exhaust area of the leakage hole 121 to decrease can be avoided, and the gas can be ensured to flow to the leakage hole 121 along the periphery of the leakage hole 121, and the gas circulation is relatively uniform, which is beneficial to reduce the noise caused by the gas flow. Of course, in other embodiments, the barrier rib body 30 may also include a connecting portion and a shielding portion, and the shielding portion is spaced apart from the side cavity wall 112 and at least partially facing the leakage hole 121, and a gap between the shielding portion and the side cavity wall 112 is smaller than the size of the sound-absorbing particles 40, one end of the connecting portion is connected to the side cavity wall 112 and the other end of the connecting portion is connected to the shielding portion.

Figure 4:
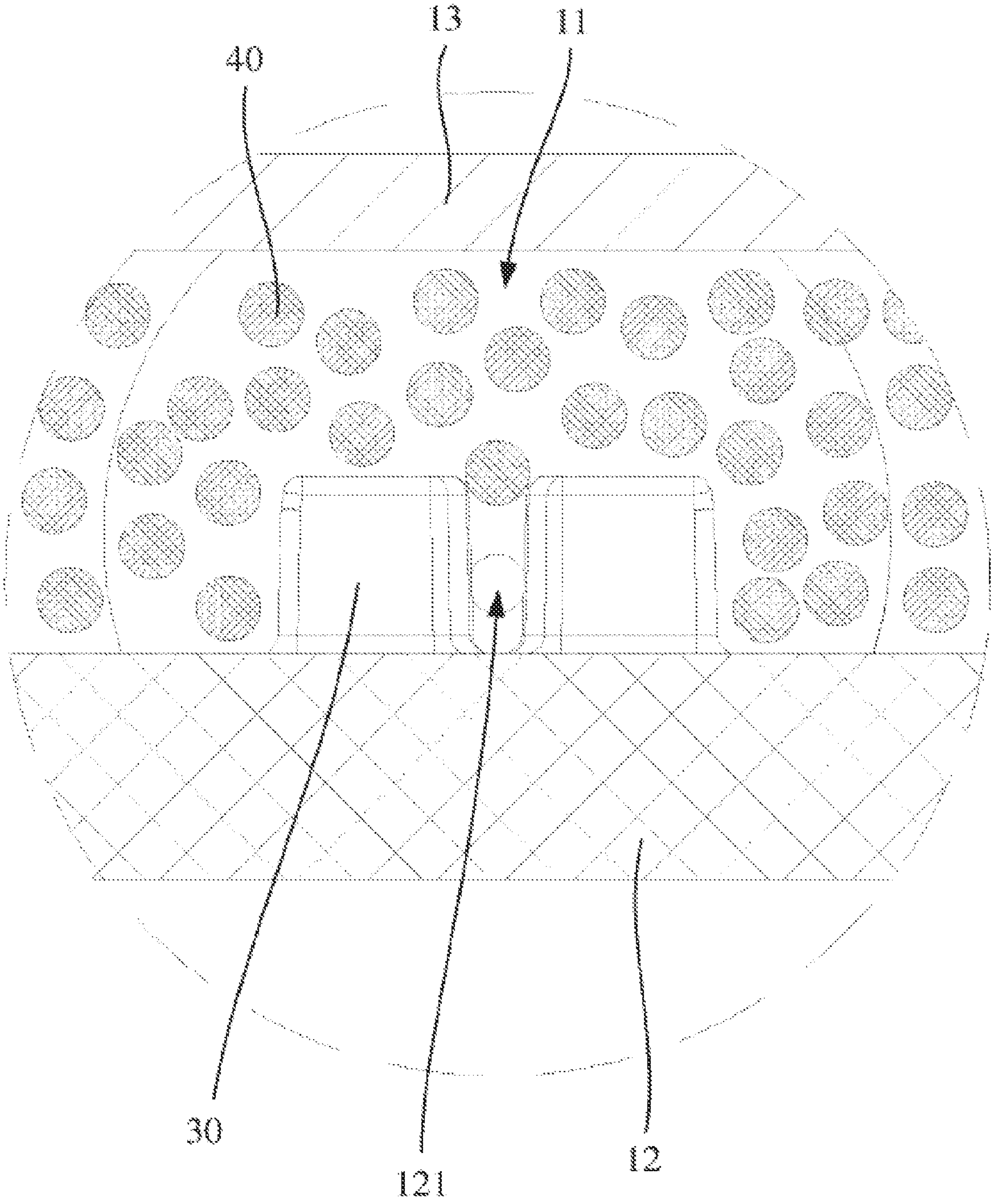
FIG. 4 is an enlarged view of B region in FIG. 3.
Figure 5:
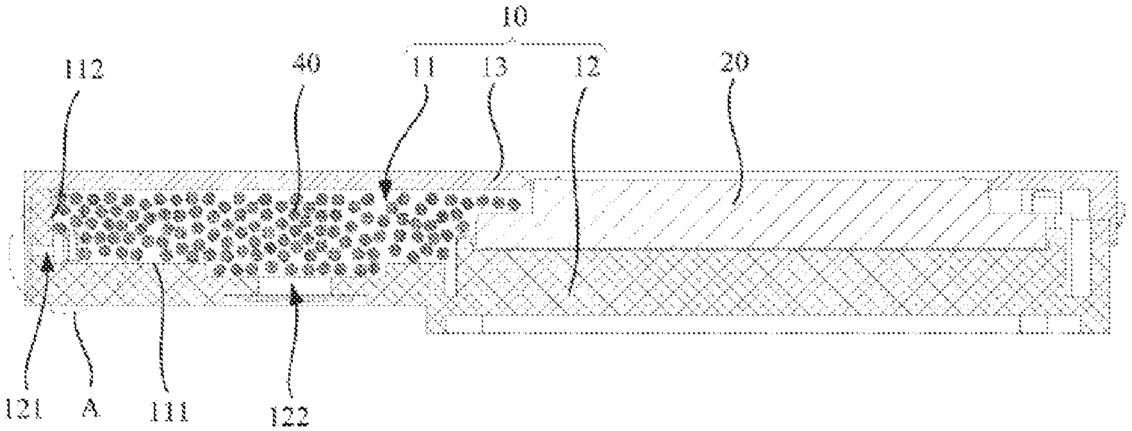
FIG. 5 is a sectional schematic view of the loudspeaker module in FIG. 1 viewed from another angle.
Figure 6:
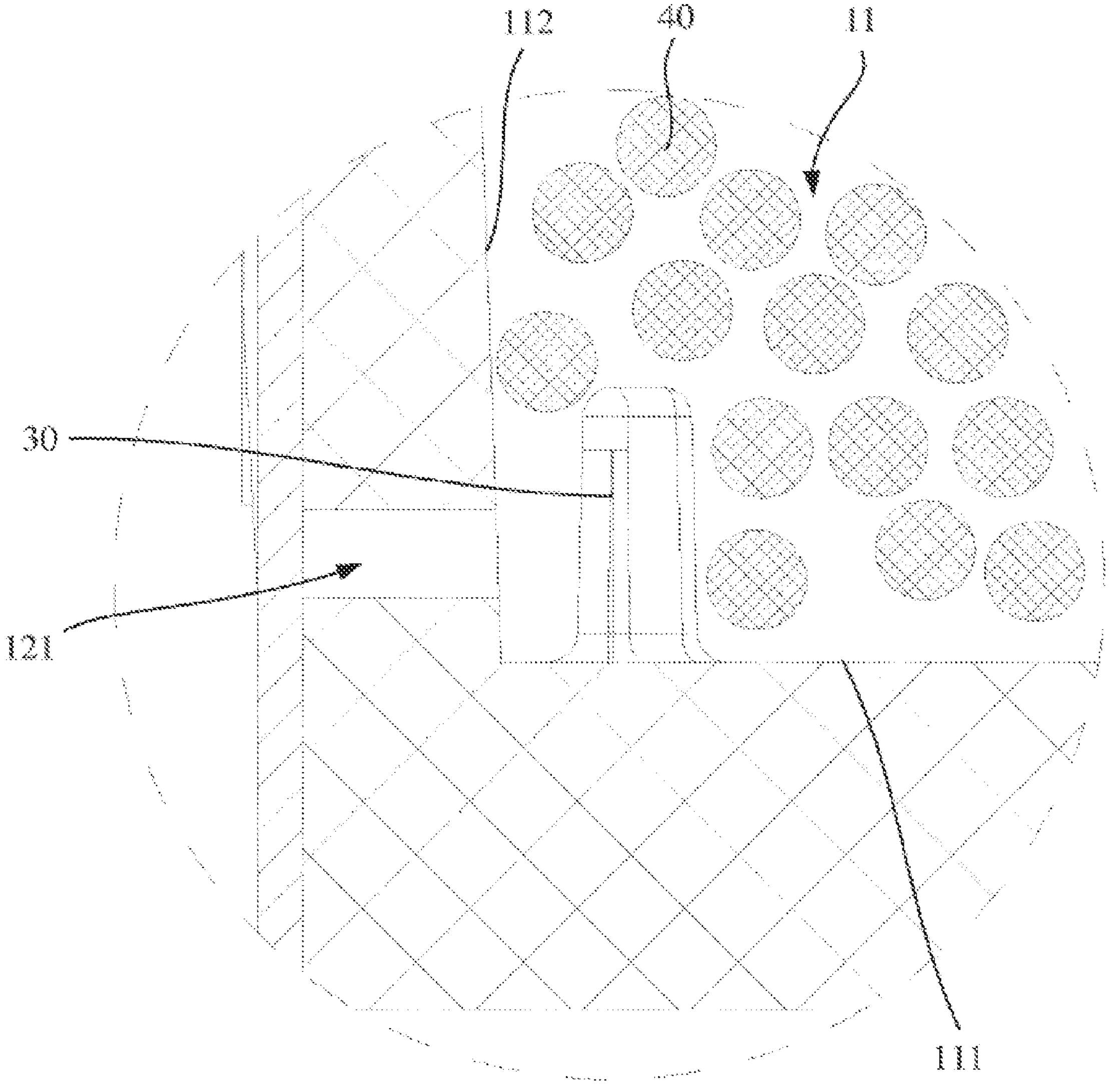
FIG. 6 is an enlarged view of C region in FIG. 5.

Referring to FIGS. 4 to 6, in an embodiment, a height of the barrier rib body 30 is greater than a distance between a hole edge of the leakage hole 121 away from the bottom cavity wall 111 and the bottom cavity wall 111. Specifically, the height of the barrier rib body 30 is the distance between an upper end thereof and the bottom cavity wall 111, the leakage hole 121 has an upper hole edge away from the bottom cavity wall 111, the height of the barrier rib body 30 is greater than the distance between the upper hole edge of the leakage hole 121 and the bottom cavity wall 111, therefore, when the sound-absorbing particles 40 are located at the upper end of the barrier rib body 30, the sound-absorbing particles 40 are far away from the leakage hole 121, that is, the distance between the sound-absorbing particles 40 and the leakage hole 121 is increased, and thereby the blocking effect on the gas flowing to the leakage hole 121 due to the sound-absorbing particles 40 can be reduced, and the gas can flow to the leakage hole 121 relatively evenly along the periphery of the leakage hole 121. Of course, in other embodiments, the height of the barrier rib body 30 may also be disposed to be less than or equal to the distance between the upper hole edge of the leakage hole 121 and the bottom cavity wall 111.

Figure 3:
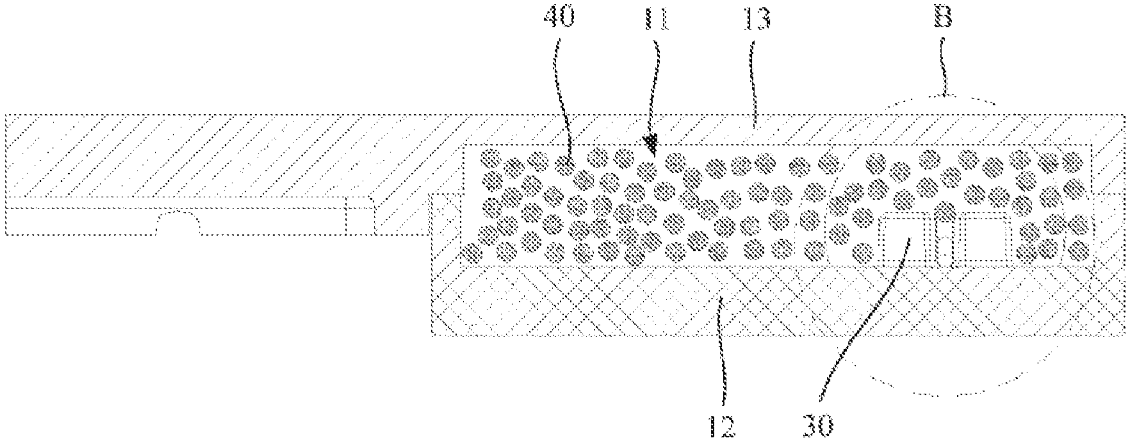
FIG. 3 is a sectional schematic view of the loudspeaker module in FIG. 1.
Figure 7:
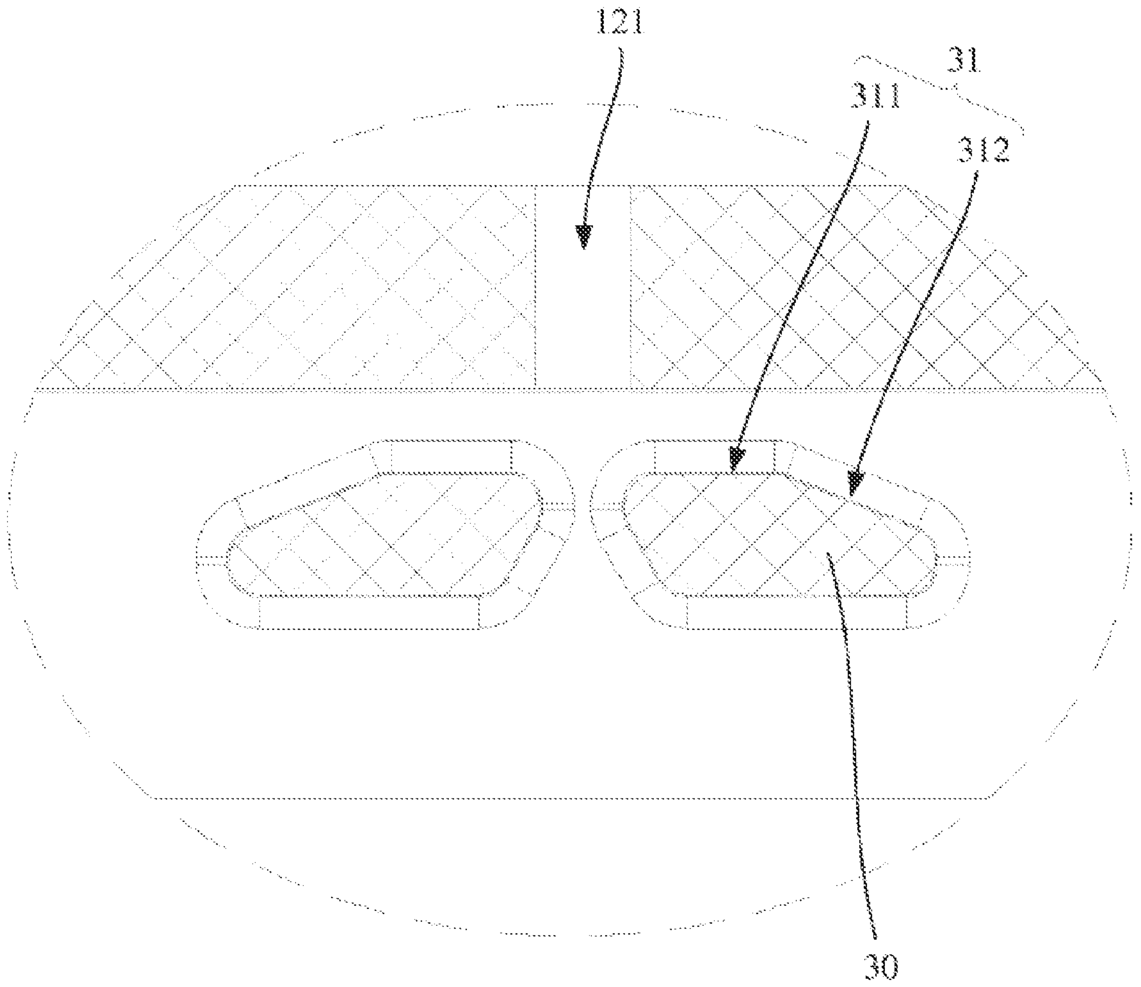
FIG. 7 is a sectional schematic view of a barrier rib body and a leakage hole in FIG. 2.

Referring to FIGS. 3 and 7, in an embodiment, the bather rib body 30 has a limiting surface 31, the limiting surface 31 faces the cavity wall of the rear acoustic cavity 11 provided with the leakage hole 121, the limiting surface 31 includes a plane section 311, and a distance between the plane section 311 and the cavity wall of the rear acoustic cavity 11 is smaller than the size of the sound-absorbing particles 40. Specifically, the limiting surface 31 faces the side cavitywall 112 and is spaced apart from the side cavity wall 112, and the plane section 311 has an area less than or equal to that of the limiting surface 31, the plane section 311 is adjacent to the leakage hole 121, and the distance between the plane section 311 and the side cavity wall 112 is smaller than the size of the sound-absorbing particles 40, that is, the barrier rib body 30 blocks the movement of the sound-absorbing particles 40 toward the leakage hole 121 by the plane section 311. In addition, since the flow direction and the flow velocity of the gas flowing out between each of the sound-absorbing particles 40 are quite different when the gas flows out from the gaps between the plurality of sound-absorbing particles 40, therefore, by providing the plane section 311, the distance between the sound-absorbing particles 40 and the leakage hole 121 can be increased, and furthermore the gap between the plane section 311 and the side cavity wall 112 is larger than the gaps between the plurality of sound-absorbing particles 40, and when the gas flows from the gaps between the plurality of sound-absorbing particles 40 to the gap between the plane section 311 and the side cavity wall 112, the gas can be buffered between the plane section 311 and the side cavity wall 112 and can flow into the leakage hole 121 along the periphery of the leakage hole 121 at a relatively gentle flow rate, which is beneficial to reduce the Reynolds number of the gas flow and reduce noise.

In an embodiment, the limiting surface 31 further includes an inclined section 312 connected with the plane section 311, the inclined section 312 is located at a side of the plane section 311 away from the leakage hole 121, and a distance between the inclined section 312 and the cavity wall of the rear acoustic cavity 11 gradually increases in a direction away from the leakage hole 121. Specifically, the distance between the inclined section 312 and the side cavity wall 112 is greater than the distance between the plane section 311 and the side cavity wall 112, and the inclined section 312 and the side cavity wall 112 form into a bellmouth shape with a gradually increasing gap in a direction away from the plane section 311, so as to facilitate to guide the gas to flow from between the limiting surfaces 31 to the leakage hole 121. Furthermore, by providing the limiting surface 31 into the form of a plane section 311 and an inclined section 312, the overall distance between the limiting surface 31 and the side cavity wall 112 is increased, that is, the size of the bump on the mold for molding the limiting surface 31 during injection molding can be increased, which is beneficial to improve the strength of the mold, and thereby being capable of reducing the possibility of deformation of the bump on the mold, ensuring the molding yield of the barrier rib body 30, and furthermore being capable of improving the service life of the mold and reducing the production cost.

In an embodiment, the present disclosure is provided with two bather rib bodies 30, the two bather rib bodies 30 are arranged to be spaced from each other, and the leakage hole 121 is located between the two barrier rib bodies 30. Specifically, the two bather rib bodies 30 are both disposed on the bottom cavity wall 111 and are arranged to be spaced apart from the side cavity wall 112, and the distance between each barrier rib body 30 and the side cavity wall 112 is smaller than the size of the sound-absorbing particles 40, and at least one barrier rib body 30 is disposed to face the leakage hole 121. Compared with the case in which one barrier rib body 30 is provided, more sound-absorbing particles 40 can be blocked by providing two barrier rib bodies 30, moreover, the leakage hole 121 is arranged between the two barrier rib bodies 30 so that the gas can directly flow to the leakage hole 121 from the gap between the two barrier rib bodies 30, which can reduce the blocking effect on the gas due to the barrier rib bodies 30, and the gas circulation effect is good. Of course, in other embodiments, the barrier rib body 30 may be provided with one or more, for example, the number of barrier rib body 30 may also be three or four, and so on.

Referring to FIGS. 4 and 7, in an embodiment, a distance between ends of the two barrier rib bodies 30 adjacent to the leakage hole 121 is smaller than the size of the sound-absorbing particles 40. In this way, when the sound-absorbing particles 40 move in the direction directly opposite to the leakage hole 121, the sound-absorbing particles 40 can be captured between the two barrier rib bodies 30 so that the sound-absorbing particles 40 between the two barrier rib bodies 30 are spaced from the hole edge of the leakage hole 121. It can avoid the problem that the gas around the leakage hole 121 may be blocked from flowing toward the leakage hole 121 and resulting in poor gas flow uniformity when the sound-absorbing particles 40 come into contact with the hole edge of the leakage hole 121.

In addition, in order to ensure the flow effect of the gas, in an embodiment, a distance between the two barrier rib bodies 30 is configured to gradually increase in the direction away from the leakage hole 121. Specifically, the surfaces facing to each other of the two barrier rib bodies 30 are inclined towards opposite directions in the direction away from the leakage hole 121, so that the gap between the two barrier rib bodies 30 forms into a bellmouth shape which increases towards the direction away from the leakage hole 121, and thereby being capable of reducing the blocking effect on the gas due to the barrier rib bodies 30, and being capable of better guiding the gas to flow from between the two barrier rib bodies 30 to the leakage hole 121. Of course, the other embodiments may also configured to incline only the surface of one barrier rib body 30 facing the other barrier rib body 30.

There are various fixing methods between the barrier rib body 30 and the housing 10. For example, in an embodiment, the barrier rib body 30 is integrally formed with the housing 10. Specifically, the barrier rib body 30 is integrally injection-molded with the housing 10, that is, the barrier rib body 30 may be formed together at the time of forming the housing 10, which reduces an additional step of mounting the barrier rib body 30 on the housing 10, and thereby can improve production efficiency. Furthermore, the connection between the barrier rib body 30 and the housing 10 is more stable, and the service life is longer. Of course, in other embodiments, the barrier rib body 30 may also be adhered to the housing 10, or the barrier rib body 30 may be fixed on the housing 10 by bolts.

Referring to FIG. 1 again, in an embodiment, the upper housing 12 is further provided with a filling hole 122 communicated with the rear acoustic cavity 11 and a cover plate that covers the filling hole 122. Specifically, after assembling the upper housing 12 and the lower housing 13, the sound-absorbing particles 40 can be filled into the rear acoustic cavity 11 through the filling hole 122, to ensure the entire rear acoustic cavity 11 to be filled with the sound-absorbing particles 40; in addition, the cover plate closes the filling hole 122 to avoid the leakage of sound-absorbing particles 40. Among them, the cover plate is detachably connected with the upper housing 12, so as to facilitate to open the cover plate to replace the sound-absorbing particles 40. In this embodiment, both the leakage hole 121 and the filling hole 122 are arranged on the upper housing 12 to facilitate molding.

The present disclosure also provides an electronic apparatus, which includes an apparatus body and a loudspeaker module. The specific structure of the loudspeaker module refers to the above-mentioned embodiments. Since the electronic apparatus adopts all the technical solutions of the above-mentioned embodiments, the electronic apparatus at least has all the beneficial effects obtained by the technical solutions of the above embodiments, which will not be repeated here. Wherein, the loudspeaker module is disposed on the apparatus body, and the apparatus body can produce sound through the loudspeaker module. The electronic apparatus may be mobile phones, computers, tablets or smart loudspeakers, etc.

The above are only preferred embodiments of the present disclosure, and are not intended to limit the scope of the invention. In addition, the equivalent structure transformation made by using the contents of the description and drawings of the present disclosure, or the direct/indirect applications in other relevant technical fields, are included within the protection scope of the present disclosure.

What is claimed is:

1. A loudspeaker module, comprising:
- a housing;
- a loudspeaker unit provided in an inner cavity of the housing and divides the inner cavity of the housing into a front acoustic cavity and a rear acoustic cavity, the rear acoustic cavity is filled with sound-absorbing particles, and a cavity wall of the rear acoustic cavity is provided with a leakage hole; and
- a barrier rib body provided in the rear acoustic cavity, at least a part of the barrier rib body faces the leakage hole, and a distance between the leakage hole and the part of the barrier rib body facing the leakage hole is less than sizes of the sound-absorbing particles.

2. The loudspeaker module of claim 1, wherein the rear acoustic cavity comprises a bottom cavity wall and a side cavity wall connected to the bottom cavity wall, the leakage hole is provided on the side cavity wall, and the barrier rib body is disposed to protrude from the bottom cavity wall.

3. The loudspeaker module of claim 2, wherein a height of the barrier rib body is greater than a distance between a hole edge of the leakage hole away from the bottom cavity wall and the bottom cavity wall.

4. The loudspeaker module of claim 1, wherein the barrier rib body has a limiting surface, the limiting surface faces the cavity wall of the rear acoustic cavity provided with the leakage hole, the limiting surface has a plane section, and a distance between the plane section and the cavity wall of the rear acoustic cavity is smaller than the sizes of the sound-absorbing particles.

5. The loudspeaker module of claim 4, wherein the limiting surface further comprises an inclined section connected with the plane section, the inclined section is located at a side of the plane section away from the leakage hole, and a distance between the inclined section and the cavity wall of the rear acoustic cavity gradually increases in a direction away from the leakage hole.

6. The loudspeaker module of claim 1, wherein there are two barrier rib bodies, the two barrier rib bodies are arranged to be spaced from each other, and the leakage hole is located between the two barrier rib bodies.

7. The loudspeaker module of claim 6, wherein a distance between ends of the two barrier rib bodies adjacent to the leakage hole is smaller than the sizes of the sound-absorbing particles.

8. The loudspeaker module of claim 7, wherein a distance between the two barrier rib bodies is disposed to gradually increase in a direction away from the leakage hole.

9. The loudspeaker module of claim 1, wherein the barrier rib body is integrally formed with the housing.

10. An electronic apparatus, comprising the loudspeaker module of claim 1.

* * * * *